(12) United States Patent
Wang (10) Patent No.: US 12,160,782 B2
(45) Date of Patent: Dec. 3, 2024

(54) CELL RESELECTION METHOD, DEVICE, STORAGE MEDIUM, AND USER TERMINAL

(71) Applicant: SPREADTRUM COMMUNICATIONS (SHANGHAI) CO., LTD., Shanghai (CN)

(72) Inventor: Tingting Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 650 days.

(21) Appl. No.: 17/427,836

(22) PCT Filed: Jan. 8, 2020

(86) PCT No.: PCT/CN2020/070856
§ 371 (c)(1),
(2) Date: Aug. 2, 2021

(87) PCT Pub. No.: WO2020/156065
PCT Pub. Date: Aug. 6, 2020

(65) Prior Publication Data
US 2022/0141737 A1 May 5, 2022

(30) Foreign Application Priority Data
Jan. 31, 2019 (CN) .......................... 201910098419.8

(51) Int. Cl.
*H04W 36/00* (2009.01)
*H04W 36/24* (2009.01)
(Continued)

(52) U.S. Cl.
CPC ... *H04W 36/0079* (2018.08); *H04W 36/0058* (2018.08); *H04W 36/249* (2023.05);
(Continued)

(58) Field of Classification Search
CPC ......... H04W 36/0055; H04W 36/0058; H04W 36/0061; H04W 36/0079; H04W 36/0083;
(Continued)

(56) References Cited

U.S. PATENT DOCUMENTS

2008/0102847 A1* 5/2008 Kim .................. H04W 36/0085
455/552.1
2010/0304748 A1 12/2010 Henttonen et al.
(Continued)

FOREIGN PATENT DOCUMENTS

CN 101742598 A 6/2010
CN 105704767 A 6/2016
(Continued)

OTHER PUBLICATIONS

Anonymous, "3rd Generation Partnership Project; Technical Specification Group Radio Access Network", 3GPP TS 38.304; V15.2.0; Dec. 2018; 28 pages.
(Continued)

*Primary Examiner* — Matthew W Genack
(74) *Attorney, Agent, or Firm* — CANTOR COLBURN LLP (57) ABSTRACT

Provided are a cell reselection method, device, a storage medium, and a user terminal, the method includes: if the number of consecutive failures of the LBT in the previous cell exceeds a preset threshold, residing in the current serving cell; when the current serving cell requires to perform cell reselection, reducing at least one reselection parameter value of the previous cell, and determining the set of target cells according to the reselection parameter value of each cell; sorting the target cells in the set; selecting the top sorted target cell sequentially to perform cell reselection.

10 Claims, 2 Drawing Sheets

(51) Int. Cl.
*H04W 36/30* (2009.01)
*H04W 74/0816* (2024.01)

(52) U.S. Cl.
CPC ....... *H04W 36/304* (2023.05); *H04W 36/305* (2018.08); *H04W 74/0816* (2013.01)

(58) Field of Classification Search
CPC ..... H04W 36/00833; H04W 36/00835; H04W 36/008357; H04W 36/00837; H04W 36/0085; H04W 36/08; H04W 36/30; H04W 36/302; H04W 36/304; H04W 36/305; H04W 74/08; H04W 74/0808; H04W 74/0816; H04W 74/0825; H04W 74/0833
See application file for complete search history.

(56) References Cited

U.S. PATENT DOCUMENTS

| | | | |
|---|---|---|---|
| 2011/0269462 A1 | 11/2011 | Sagfors et al. | |
| 2012/0282931 A1* | 11/2012 | Giustina | H04W 36/22 455/437 |
| 2018/0352573 A1 | 12/2018 | Yang et al. | |
| 2019/0124690 A1 | 4/2019 | Siomina et al. | |
| 2019/0132760 A1 | 5/2019 | Siomina et al. | |
| 2020/0100294 A1* | 3/2020 | Chen | H04W 80/02 |
| 2020/0170004 A1 | 5/2020 | Si et al. | |

FOREIGN PATENT DOCUMENTS

| | | |
|---|---|---|
| CN | 107026723 A | 8/2017 |
| CN | 107071842 A | 8/2017 |
| CN | 107155203 A | 9/2017 |
| CN | 107371168 A | 11/2017 |
| CN | 109076373 A | 12/2018 |
| CN | 109195190 A | 1/2019 |
| CN | 109219095 A | 1/2019 |
| CN | 109257778 A | 1/2019 |
| EP | 3355602 A1 | 8/2018 |
| WO | 2016144495 A1 | 9/2016 |
| WO | 2017133596 A1 | 8/2017 |
| WO | 2017067746 A1 | 10/2017 |
| WO | 2017167746 A1 | 10/2017 |

OTHER PUBLICATIONS

EPO Extended European Search Report for corresponding EP Application No. 207482363.9; Issued on Feb. 21, 2022.
Media Tek Inc., "Cell Selection and Reselection in NR-U", 3GPP TSG-RAN2 #104 meeting; Tdoc R2-1816480; Nov. 12-16, 2018; 4 pages.
ZTE, "Considerations on mobility for NR-U", 3GPP TSG-RAN WG2 NR AH1807 Meeting; R2-1809838; Jul. 2-6, 2018; 3 pages.
International Search Report for International Application No. PCT/JP2020/070856; Date of Mailing, Apr. 8, 2020.
Hisilicon, "Cell selection and reselection rules." 3GPP TSG-RAN WG2 Meeting #100, R2-1713290, Resubmission of R2-1710466, Reno, USA, Nov. 27 to Dec. 1, 2017; 5 pages.
Samsung, "On indicating LBT failure for NR-U," 3GPP TSG-RAN WG2#104, R2-1817934, Resubmission of R2-1815311, Spokane, Washington, USA, Nov. 12-16, 2018; 1 page.

* cited by examiner

CELL RESELECTION METHOD, DEVICE, STORAGE MEDIUM, AND USER TERMINAL

CROSS-REFERENCE TO RELATED APPLICATIONS

This is the U.S. national stage of Application No. PCT/CN2020/070856, filed on Jan. 8, 2020. Priority under 35 U.S.C. § 119(a) and 35 U.S.C. § 365(b) is claimed from Chinese Patent Application No. 201910098419.8, filed on Jan. 31, 2019, the disclosure of which is incorporated herein by reference.

TECHNICAL FIELD

The present disclosure generally relates to communication technology field, and more particularly, to a cell reselection method and device, a storage medium and a user equipment.

BACKGROUND

The 3rd Generation Partnership Project (3GPP) standards organization will study how to deploy Fifth-Generation mobile communications (5G) New Radio (NR) systems on unlicensed spectrums, so as to achieve fair and effective use of unlicensed spectrums and increase a data transmission rate of the NR systems.

For the use of unlicensed spectrums, different countries have different control methods. For example, it is necessary to use the unlicensed spectrums in the manner of Listen-Before-Talk (LBT).

In the 5G NR communication systems, User Equipment (UE) state includes Radio Resource Control-Idle (RRC-IDLE) state, RRC-Inactive state and RRC-Connected state. Based on the UE entering the RRC-Connected state from the RRC-IDLE state, it needs to perform RRC connection setup, and based on the UE entering the RRC-Connected state from the RRC-Inactive state, it needs to perform an RRC connection resume procedure. The UE can perform cell reselection in the RRC-IDLE state or the RRC-Inactive state, and reselect a more suitable cell, such as a cell with better signal quality or higher priority.

However, due to the sharing of unlicensed spectrums, consecutive LBT failures may occur. Specifically, based on the number of consecutive LBT failures exceeding a preset threshold, or the number of consecutive LBT failures within a preset time period exceeding another preset threshold, it is called an LBT consecutive failure. In existing techniques, based on the LBT consecutive failure event occurring, the UE may reselect another cell.

However, in the existing techniques, based on the UE needing to perform cell reselection again, it is prone to select the previous cell, which results in an LBT consecutive failure event again.

SUMMARY

Embodiments of the present disclosure provide a cell reselection method and device, a storage medium and a user equipment, which may reduce possibility of reselecting a previous cell.

In an embodiment of the present disclosure, a cell reselection method is provided, including: based on a number of consecutive LBT failures in a previous cell exceeding a preset threshold, camping on a current serving cell; based on cell reselection needing to be performed in the current serving cell, decreasing at least one reselection parameter value of the previous cell, and determining a set of target cells based on reselection parameter values of each cell; sorting the target cells in the set; and selecting the target cells that are ranked first successively to perform cell reselection, wherein the possibility of the target cell being selected becomes lower as the reselection parameter value of the target cell decreases.

Optionally, the reselection parameter value includes a cell selection reception level value and a cell selection quality value, and said determining the set of target cells based on reselection parameter values of each cell includes: determining cells whose cell selection reception level value and cell selection quality value are both greater than zero as the target cells.

Optionally, based on the cell being the previous cell, it is determined that the cell selection reception level value of the previous cell is a value obtained by subtracting a first temporary offset from an initial cell selection reception level value; and/or, based on the cell being the previous cell, it is determined that the cell selection quality value of the previous cell is a value obtained by subtracting a second temporary offset from an initial cell selection quality value.

Optionally, the reselection parameter value further includes an R value, and said sorting the target cells in the set includes: determining the R value of each target cell in the set, wherein based on the target cells in the set including the previous cell, it is determined that the R value of the previous cell is a value obtained by subtracting a third temporary offset from an initial R value; and sorting the target cells according to the R value, wherein the ranking of the target cell becomes higher as the R value increases.

Optionally, the R value of the previous cell is determined based on following formula, $$R_n = Q_{meas,n} - Q_{offset} - Q_{offsettemp3},$$

where $R_n$ represents the R value of the previous cell, $Q_{meas,n}$ represents a Reference Signal Receiving Power (RSRP) measurement value of the previous cell, $Q_{offset}$ represents an offset value, and $Q_{offsettemp3}$ represents a third temporary offset.

Optionally, the cell selection reception level value and the cell selection quality value of the previous cell are determined based on following formula, $$S_{rxlev} = P - X - Q_{offsettemp1},$$

$$S_{qual} = Q - Y - Q_{offsettemp2},$$

where $S_{rxlev}$ represents the cell selection reception level value of the previous cell, P represents a measured previous cell selection reception level value, X represents a previous cell selection reception level value threshold, $Q_{offsettemp1}$ represents a first temporary offset, $S_{qual}$ represents the cell selection quality value of the previous cell, Q represents a measured previous cell selection quality value, Y represents a previous cell selection quality value threshold, and $Q_{offsettemp2}$ represents a second temporary offset.

Optionally, the reselection parameter value includes a frequency priority, and said determining the set of target cells based on reselection parameter values of each cell includes: determining a frequency priority of each available cell; and determining the set of target cells based on the frequency priorities of the available cells.

Optionally, prior to said determining the frequency priority of each available cell, the method further includes: determining a first available cell based on a frequency where the previous cell is located; and decreasing the frequency priority of the first available cell located on the frequency by a preset level.

Optionally, said determining the set of target cells based on the frequency priorities of the available cells includes: based on the frequency priorities from high to low, determining whether signal quality of the available cell exceeds preset quality within a preset time period, until it is determined that one or more second available cells whose signal quality exceeds the preset quality within the time period are located on one frequency priority; and determining the set of the target cells based on the one or more second available cells, wherein based on the available cells including the previous cell, it is determined that a preset duration of the previous cell is longer than a preset duration of other cells in the available cells, and/or it is determined that preset quality of the previous cell is higher than preset quality of other cells in the available cells.

Optionally, the reselection parameter value further includes an R value, and said sorting the target cells in the set includes: determining an R value of each target cell in the set; and sorting the target cells according to the R value, wherein the ranking of the target cell becomes higher as the R value increases.

Optionally, based on frequency priority of the second available cell being higher than frequency priority of the current serving cell, the preset quality of the previous cell is determined based on following formula, $$\text{Thresh}=\text{Thresh}_x+Q_{offsettemp4},$$

or, based on the frequency priority of the second available cell being lower than the frequency priority of the current serving cell, the preset quality of the previous cell is determined based on following formula, $$\text{Thresh}=\text{Thresh}_x+Q_{offsettemp5},$$

where Thresh represents the preset quality of the previous cell, $\text{Thresh}_x$ represents initial preset quality of the previous cell, $Q_{offsettemp4}$ represents a fourth temporary offset, and $Q_{offsettemp5}$ represents a fifth temporary offset.

Optionally, the previous cell is a serving cell that has been camped on within a preset time period.

In an embodiment of the present disclosure, a cell reselection device is provided, including: a switching circuitry configured to: based on a number of consecutive LBT failures in a previous cell exceeding a preset threshold, camp on a current serving cell; a determining circuitry configured to: based on cell reselection needing to be performed in the current serving cell, decrease at least one reselection parameter value of the previous cell, and determine a set of target cells based on reselection parameter values of each cell; a sorting circuitry configured to sort the target cells in the set; and a reselecting circuitry configured to reselect the target cells that are ranked first successively to perform cell reselection, wherein the possibility of the target cell being selected becomes lower as the reselection parameter value of the target cell decreases.

In an embodiment of the present disclosure, a storage medium having computer instructions stored therein is provided, wherein when the computer instructions are executed, the above cell reselection method is performed.

In an embodiment of the present disclosure, a user equipment including a memory and a processor is provided, wherein the memory has computer instructions stored therein, and when the processor executes the computer instructions, the above cell reselection method is performed.

DETAILED DESCRIPTION

In the existing techniques, unlicensed spectrums are used in the LBT manner. The unlicensed spectrums being used by the NR system is also called New RAT Un-license (NR-U) technology.

Specifically, using LBT, Clear Channel Assessment (CCA) can be performed before communication between a sender and a receiver. Based on the assessment result being that the channel is idle, data is sent immediately; otherwise, data cannot be transmitted until the end of a next fixed frame period. The fixed frame is composed of a Channel Occupancy Time (COT) and an idle period, where the COT is from 1 millisecond (ms) to 10 ms, and a minimum idle period is 5% of the COT.

A threshold of the number of consecutive LBT failures and a time threshold may be configured on a network side, and may be notified to a terminal through a dedicated message or a public message. The dedicated message may use, for example, Radio Resource Control (RRC) signaling, and the public message may use, for example, System Information Block (SIB).

In specific implementations, the problem of LBT consecutive failure may occur. For example, if the network side configures the threshold of the number of consecutive LBT failures to 8, the LBT fails 8 times consecutively can be regarded as the LBT consecutive failure. It could be understood that a time threshold T1 and a number threshold can be set for consecutive LBT failures, for example, 10s and 8 times, then the LBT failing 8 times consecutively within 10s can be regarded as the occurrence of LBT consecutive failure.

The inventor has discovered through research that in the existing techniques, especially after consecutive LBT failures, a UE can camp on a more appropriate cell such as a cell with better signal quality, a cell with less interference, a cell with a lighter load, or a cell with a higher priority, through procedures such as cell reselection, cell selection, or RRC reestablishment. However, based on the UE needing to perform cell reselection in the serving cell where the UE is camping on, the cell is selected for cell reselection from all available serving cells including the previous cell, and it is prone to reselect the previous cell, which easily causes consecutive LBT failures again.

In embodiments of the present disclosure, based on a number of consecutive LBT failures in a previous cell exceeding a preset threshold, a current serving cell is camped on. Based on cell reselection needing to be performed in the current serving cell, at least one reselection parameter value of the previous cell is decreased, and a set of target cells is determined based on reselection parameter values of each cell; the target cells in the set are sorted; and the target cells that are ranked first are selected successively to perform cell reselection. Compared with the existing techniques where reselection is performed to all the cells based on same conditions by UE, in the embodiments, by decreasing at least one reselection parameter value of the previous cell, and determining the set of target cells according to the reselection parameter value of each cell, and then performing cell reselection, it is not prone to reselect the previous cell, that is, possibility of reselecting the previous cell is reduced.

In order to clarify the objects, characteristics and advantages of the disclosure, embodiments of present disclosure will be described in detail in conjunction with accompanying drawings.

Figure 1:
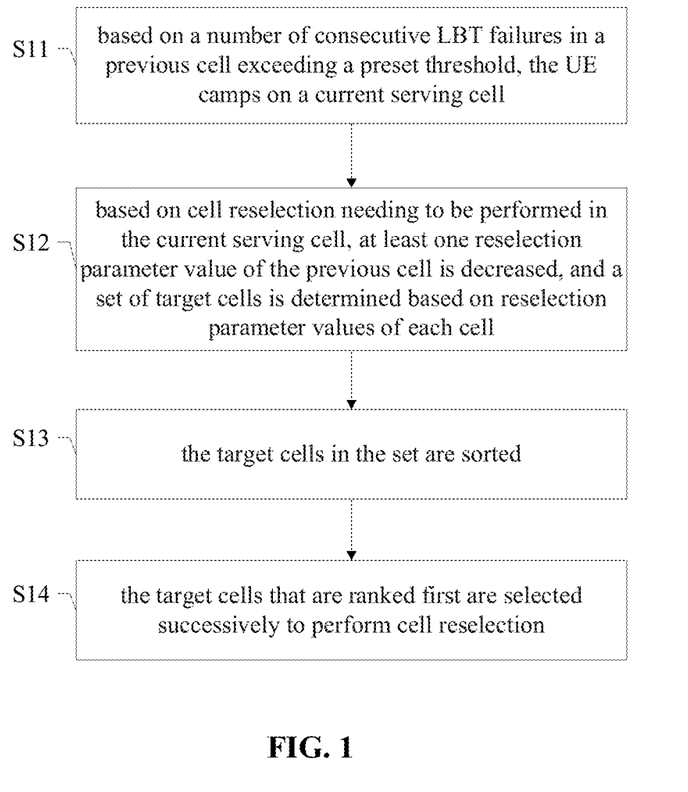
FIG. 1 is a flow chart of a cell reselection method according to an embodiment.

Referring to FIG. 1, FIG. 1 is a flow chart of a cell reselection method according to an embodiment. The method may be applied at a UE side, and may include S11 to S14.

In S11, based on a number of consecutive LBT failures in a previous cell exceeding a preset threshold, the UE camps on a current serving cell.

In S12, based on cell reselection needing to be performed in the current serving cell, at least one reselection parameter value of the previous cell is decreased, and a set of target cells is determined based on reselection parameter values of each cell.

In S13, the target cells in the set are sorted.

In S14, the target cells that are ranked first are selected successively to perform cell reselection.

The possibility of the target cell being selected becomes lower as the reselection parameter value of the target cell decreases.

In some embodiments, in S1, the UE initiates uplink transmission which includes transmission of data and signaling. Based on consecutive LBT failures occurring, the number of the consecutive LBT failures is counted to determine whether an LBT consecutive failure event has occurred.

In some embodiments, based on the number of consecutive LBT failures exceeding a predetermined threshold, it is determined that an LBT consecutive failure event has occurred. The predetermined threshold may be sent to the UE from the network side, or may be predefined by a protocol. Furthermore, based on the number of the consecutive LBT failures exceeding the preset number threshold, the UE may camp on the current serving cell through procedures such as cell reselection, cell selection or RRC reestablishment.

It should be noted that the previous cell may not be limited to the last camped cell before the UE switches to the current serving cell, and may be any camped cell before the UE switches to the current serving cell, that is, in the embodiments of the present disclosure, the previous cell where the number of consecutive LBT failures exceeds the preset number threshold may be used to indicate any camping cell where the LBT consecutive failure event has occurred before the UE switches to the current serving cell. The camped cell is a serving cell in which the UE receives a communication service in an RRC-IDLE state, an RRC-Inactive state or an RRC-connected state. The communication service means that the terminal in the RRC-IDLE state or the RRC-Inactive state receives system information, paging messages, etc. of the camped cell, or the terminal in the RRC-connected state performs operations such as transmitting and receiving data or signaling with a base station of the camped cell.

In some embodiments, in S12, based on the current serving cell needing to perform cell reselection, although the set of target cells is determined among all available serving cells including the previous cell where the LBT consecutive failure event has occurred, the possibility of the previous cell being selected may be reduced by decreasing at least one reselection parameter value of the previous cell.

In some embodiments, the possibility of the target cell being selected becomes lower as the reselection parameter value of the target cell decreases.

In some embodiments, the target cell may be a cell that helps to improve communication quality after reselection, for example, a cell with better signal quality or a cell with higher priority.

In some embodiments, the target cells may be intra-frequency cells or inter-frequency cells with the same frequency priority.

In some embodiments, the reselection parameter value includes a cell selection reception level value and a cell selection quality value, and determining the set of target cells based on reselection parameter values of each cell includes: determining cells whose cell selection reception level value and cell selection quality value are both greater than zero as the target cells.

It should be noted that the smaller the selection reception level value and/or the cell selection quality value of the target cell, the less likely it is to be greater than zero, that is, the possibility of the target cell being selected becomes lower as the reselection parameter value of the target cell decreases.

In the embodiments of the present disclosure, in the case of intra-frequency cells or inter-frequency cells with the same priority, cells whose cell selection reception level value and cell selection quality value are both greater than zero may be determined as the set of the target cells, which helps to determine signal quality of the target cells so as to further improve accuracy of determining the appropriate cell.

In some embodiments, based on the cell being the previous cell, it is determined that the cell selection reception level value of the previous cell is a value obtained by subtracting a first temporary offset from an initial cell selection reception level value; and/or, based on the cell being the previous cell, it is determined that the cell selection quality value of the previous cell is a value obtained by subtracting a second temporary offset from an initial cell selection quality value.

In the embodiments of the present disclosure, in the case of intra-frequency cells, cells whose cell selection reception level value and cell selection quality value are both greater than zero may be determined as the set of the target cells, and the cell selection reception level value and the cell selection quality value of the previous cell are reduced, which further reduces the possibility of reselecting the previous cell.

In some embodiments, the cell selection reception level value and the cell selection quality value of the previous cell are determined based on following formula, $$S_{rxlev} = P - X - Q_{offsettemp1},$$

$$S_{qual} = Q - Y - Q_{offsettemp2},$$

where $S_{rxlev}$ represents the cell selection reception level value of the previous cell, P represents a measured previous cell selection reception level value, X represents a previous cell selection reception level value threshold, $Q_{offsettemp1}$ represents a first temporary offset. $S_{qual}$ represents the cell selection quality value of the previous cell, Q represents a measured previous cell selection quality value, Y represents a previous cell selection quality value threshold, and $Q_{offsettemp2}$ represents a second temporary offset.

$Q_{offsettemp1}$ and $Q_{offsettemp2}$ may be configured by the network side for the UE, so that the cell selection reception level value and the cell selection quality value of the previous cell can be flexibly adjusted by setting $Q_{offsettemp1}$ and $Q_{offsettemp2}$, which enables the UE to select a more appropriate target cell during reselection. Further, by setting relatively large $Q_{offsettemp1}$ and $Q_{offsettemp2}$ for the previous cell, it helps to increase difficulty for the UE to choose to camp on the previous cell, thereby reducing possibility of the UE failing to set up an RRC connection in the previous cell.

In S13, the UE sorts the target cells in the set.

In some embodiments, the reselection parameter value further includes an R value, and sorting the target cells in the set includes: determining the R value of each target cell in the set, wherein based on the target cells in the set including the previous cell, it is determined that the R value of the previous cell is a value obtained by subtracting a third temporary offset from an initial R value; and sorting the target cells according to the R value, wherein the ranking of the target cell becomes higher as the R value increases.

It should be noted that the ranking of the target cell becomes lower as the R value decreases, and the less likely it is to be selected, that is, the possibility of the previous cell being selected becomes lower as the reselection parameter value of the target cell decreases.

In some embodiments, the R value of the previous cell may be reduced, so that the previous cell is ranked more backward among the target cells, thereby further reducing the possibility of reselecting the previous cell.

In some embodiments, the R value of the previous cell is determined based on following formula, $$R_n = Q_{meas,n} - Q_{offset} - Q_{offsettemp3},$$

where $R_n$ represents the R value of the previous cell, $Q_{meas,n}$ represents an RSRP measurement value of the previous cell. $Q_{offset}$ represents an offset value, and $Q_{offsettemp3}$ represents a third temporary offset.

$Q_{offsettemp3}$ may be configured by the network side for the UE, so that the R value of each target cell can be flexibly adjusted by setting $Q_{offsettemp3}$, which enables the UE to select a more appropriate target cell during reselection.

In S14, the UE selects the target cells that are ranked first successively to perform cell reselection.

In the embodiments of the present disclosure, by determining the set of target cells and sorting the target cells in the set, an appropriate cell can be determined for cell reselection, thereby increasing a success rate of cell reselection, and further successfully initiating an RRC connection setup request or an RRC resume request.

In some embodiments, the target cells may be inter-frequency cells or inter-system cells, where different frequencies have different priorities.

Figure 2:
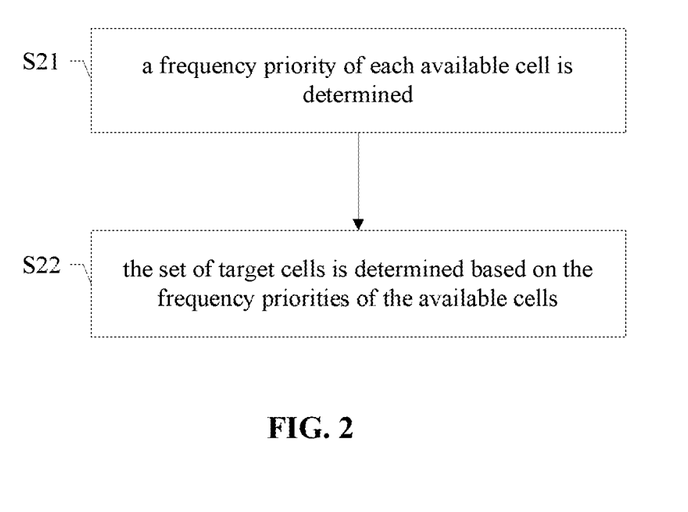
FIG. 2 is a flow chart of S12 as shown in FIG. 1 according to an embodiment.

Referring to FIG. 2, FIG. 2 is a flow chart of S12 as shown in FIG. 1 according to an embodiment. The reselection parameter value includes a frequency priority. The step of determining the set of target cells based on reselection parameter values of each cell may include S21 and S22 which are described in detail below.

In S21, a frequency priority of each available cell is determined.

The available cell is configured to be used for cell reselection. In some embodiments, as the available cells are inter-frequency cells or inter-system cells, they may have different frequency priorities.

In S22, the set of target cells is determined based on the frequency priorities of the available cells.

In some embodiments, a frequency priority may be determined based on the order of the frequency priority from high to low, where signal quality of at least one cell at this frequency priority exceeds the preset quality within the preset time period, and accordingly the at least one cell meets reselection requirements.

Figure 3:
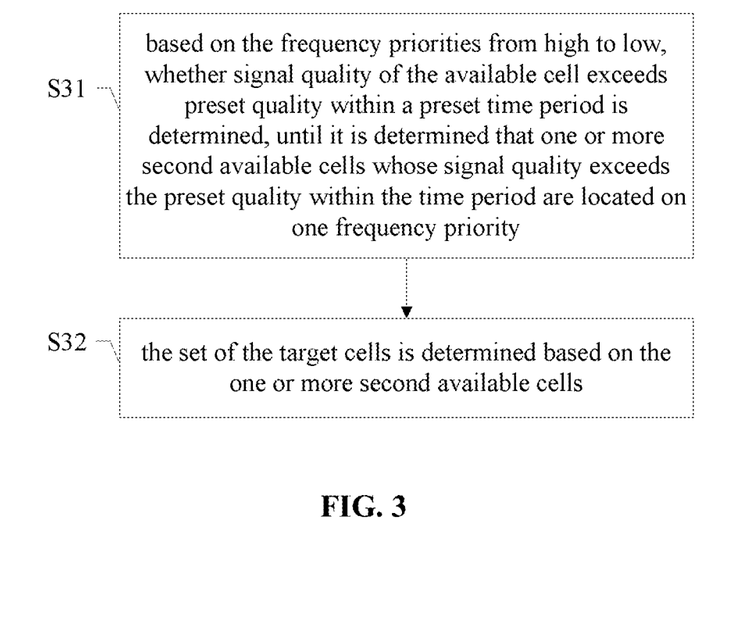
FIG. 3 is a flow chart of S22 as shown in FIG. 2 according to an embodiment.

Referring to FIG. 3, FIG. 3 is a flow chart of S22 as shown in FIG. 2 according to an embodiment. The step of determining the set of target cells based on the frequency priorities of the available cells includes S31 and S32 which are described in detail below.

In S31, based on the frequency priorities from high to low, whether signal quality of the available cell exceeds preset quality within a preset time period is determined, until it is determined that one or more second available cells whose signal quality exceeds the preset quality within the time period are located on one frequency priority, wherein based on the available cells including the previous cell, it is determined that a preset duration of the previous cell is longer than a preset duration of other cells in the available cells, and/or it is determined that preset quality of the previous cell is higher than preset quality of other cells in the available cells.

As cells with high frequency priority generally have better communication quality, it is likely to determine a cell with high quality as a reselected cell based on the order of the frequency priority from high to low. Further, in the embodiments of the present disclosure, the preset duration of the previous cell may be extended, and/or the preset quality of the previous cell may be increased to reduce the extent to which the previous cell exceeds the preset quality within the preset duration, thereby further reducing the possibility of reselecting the previous cell.

In some embodiments, based on frequency priority of the second available cell being higher than frequency priority of the current serving cell, the preset quality of the previous cell is determined based on following formula, $$\text{Thresh} = \text{Thresh}_x + Q_{offsettemp4},$$

or, based on the frequency priority of the second available cell being lower than the frequency priority of the current serving cell, the preset quality of the previous cell is determined based on following formula.

$$\text{Thresh} = \text{Thresh}_x + Q_{offsettemp5},$$

where Thresh represents the preset quality of the previous cell, $\text{Thresh}_x$ represents initial preset quality of the previous cell, $Q_{offsettemp4}$ represents a fourth temporary offset, and $Q_{offsettemp5}$ represents a fifth temporary offset.

The initial preset quality of the previous cell may be used to indicate a threshold condition for the previous available cell as a candidate cell.

In some embodiments, whether a cell can be selected as a candidate cell may be determined based on a variety of parameters, for example, using Reference Signal Receiving Power (RSRP) or Reference Signal Receiving Quality (RSRQ) and other parameters, then $\text{Thresh}_x$ is a threshold of RSRP or RSRQ.

$Q_{offsettemp4}$ and $Q_{offsettemp5}$ may be configured by the network side for the UE, so that the preset quality each target cell needs to satisfy can be flexibly adjusted by setting $Q_{offsettemp5}$, which enables the UE to select a more appropriate target cell during reselection and further reduce the possibility of the previous cell being reselected.

In S32, the set of the target cells is determined based on the one or more second available cells.

In some embodiments, the second available cells may be one or more available cells with a same frequency priority.

In the embodiments of the present disclosure, a frequency priority can be determined based on the order of the frequency priority from high to low, where signal quality of at least one cell at this frequency priority exceeds the preset quality within the preset time period, and accordingly the at least one cell meets reselection requirements. In addition, the preset duration of the previous cell may be extended, and/or the preset quality of the previous cell may be increased, which enables the UE to select a more appropriate target cell during reselection, thereby further reducing the possibility of reselecting the previous cell.

In some embodiments, after the set of target cells is determined based on the frequency priorities of the available cells, the UE may sort the target cells in the set.

In some embodiments, the reselection parameter value further includes an R value, and sorting the target cells in the set includes: determining an R value of each target cell in the set; and sorting the target cells according to the R value, wherein the ranking of the target cell becomes higher as the R value increases.

It should be noted that the ranking of the target cell becomes lower as the R value decreases, and the less likely it is to be selected, that is, the possibility of the previous cell being selected becomes lower as the reselection parameter value of the target cell decreases.

In some embodiments, the R value of the previous cell may be reduced, so that the previous cell is ranked more backward among the target cells, thereby further reducing the possibility of reselecting the previous cell.

In some embodiments, the R value of the previous cell is determined based on following formula, $$R_n = Q_{meas,n} - Q_{offset} - Q_{offsettemp3},$$

where $R_n$ represents the R value of the previous cell, $Q_{meas,n}$ represents an RSRP measurement value of the previous cell, $Q_{offset}$ represents an offset value, and $Q_{offsettemp3}$ represents a third temporary offset.

$Q_{offsettemp3}$ may be configured by the network side for the UE, so that the R value of each target cell can be flexibly adjusted by setting $Q_{offsettemp3}$, which enables the UE to select a more appropriate target cell during reselection.

In some embodiments, after sorting the target cells in the set, the UE selects the target cells that are ranked first successively to perform cell reselection.

In the embodiments of the present disclosure, in the case of inter-frequency or inter-system cells, the reselection parameter value includes the frequency priority, the frequency priority of each available cell may be determined, and the set of target cells may be determined based on the frequency priorities of the available cells. Therefore, the target cells with relatively high frequency priority may be selected. In this manner, the network side realizes operations such as load balancing, which improves overall performance of system.

In the embodiments of the present disclosure, by determining the set of target cells and sorting the target cells in the set, an appropriate cell can be determined for cell reselection, thereby increasing a success rate of cell reselection, and further successfully initiating an RRC connection setup request or an RRC resume request.

In some embodiments, the previous cell is a serving cell that has been camped on within a preset time period.

In some embodiments, for cells where LBT consecutive failures occurred too long ago, the UE may select them during reselection. Otherwise, the cells where LBT consecutive failures occurred too long ago can no longer be selected, and accordingly a selection range of the UE is narrowed because of excessive restrictions.

In the embodiments of the present disclosure, by setting the previous cell as a serving cell that has been camped on for a preset time period, the LBT consecutive failures that occurred too long ago may not affect the current reselection of the UE, thereby reducing the restrictions to the current reselection of the UE, and further improving communication quality.

In the embodiments of the present disclosure, in the case of inter-frequency or inter-system cells, based on the number of consecutive LBT failures exceeding a preset threshold, the frequency priority of a first available cell may be reduced by a preset level.

In some embodiments, during cell selection and cell reselection, the UE may obtain absolute priorities of different frequencies or Radio Access Technologies (RAT) through system information or RRC signaling, or inherit an absolute priority configured in an original RAT based on the UE being selected to NR from the original RAT.

Prior to said determining the frequency priority of each available cell, the method further includes: determining a first available cell based on a frequency where the previous cell is located; and decreasing the frequency priority of the first available cell located on the frequency by a preset level.

In some embodiments, the available cells on frequencies of all unlicensed spectrums may serve as the first available cell.

In some embodiments, based on the previous cell having consecutive LBT failures, the available cell located on the same frequency as the previous cell may also be prone to have consecutive LBT failures, and thus it is not recommended to select this type of cell (i.e., the first available cell) as the reselected cell.

In the embodiments of the present disclosure, in the case of inter-frequency or inter-system cells, different frequencies have different priorities. Based on the number of consecutive LBT failures exceeding the preset threshold, the frequency priority of the first available cell may be reduced by the preset level. Therefore, based on the second available cell being determined according to the order of the frequency priority subsequently, it is not prone to select other available cells on the frequency where the previous cell is located, which helps to further improve the accuracy of determining the appropriate cell.

$Q_{offsettemp6}$ may be used to represent the preset level and referred to as a sixth temporary offset.

In some embodiments, an effective duration T2 may be set for $Q_{offsettemp6}$, so that the first available cell can be downgraded only within a certain time period to avoid impact of long-term downgrade.

For T2, timing may start from the occurrence of N consecutive LBT failures, or from the UE initiating cell selection or cell reselection.

Compared with the existing techniques where reselection is performed to all the cells based on same conditions by the UE, in the embodiments of the present disclosure, by decreasing at least one reselection parameter value of the previous cell, and determining the set of target cells according to the reselection parameter value of each cell, and then performing cell reselection, it is not prone to reselect the previous cell, that is, possibility of reselecting the previous cell is reduced.

In some embodiments, based on the number of consecutive LBT failures in multiple cells on a same frequency exceeding a preset threshold, the frequency priority of the first available cell is lowered by a preset level. Specifically, the number of consecutive LBT failures in multiple cells on the same frequency exceeding the preset threshold means that the number M of consecutive LBT failures in multiple cells on the same frequency exceeding the preset threshold, where M is configured by the network side.

Figure 4:
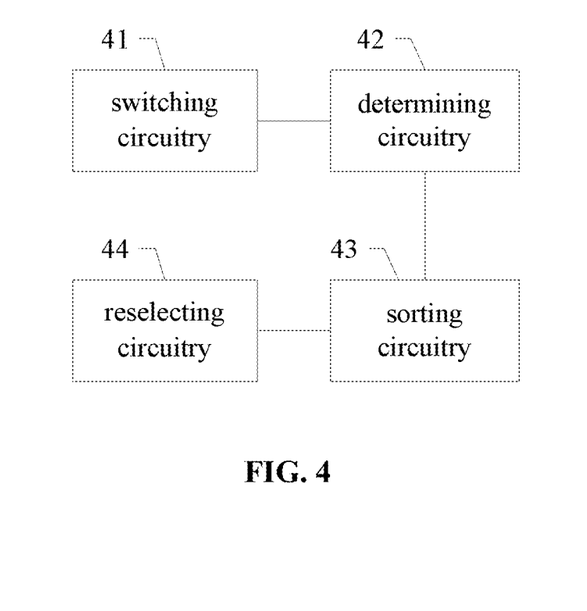
FIG. 4 is a structural diagram of a cell reselection device according to an embodiment.

Referring to FIG. 4, FIG. 4 is a structural diagram of a cell reselection device according to an embodiment. The device includes: a switching circuitry 41 configured to: based on a number of consecutive LBT failures in a previous cell exceeding a preset threshold, camp on a current serving cell; a determining circuitry 42 configured to: based on cell reselection needing to be performed in the current serving cell, decrease at least one reselection parameter value of the previous cell, and determine a set of target cells based on reselection parameter values of each cell; a sorting circuitry 43 configured to sort the target cells in the set; and a reselecting circuitry 44 configured to reselect the target cells that are ranked first successively to perform cell reselection, wherein the possibility of the target cell being selected becomes lower as the reselection parameter value of the target cell decreases.

Compared with the existing techniques where reselection is performed to all the cells based on same conditions by the UE, in the embodiments of the present disclosure, by decreasing at least one reselection parameter value of the previous cell, and determining the set of target cells according to the reselection parameter value of each cell, and then performing cell reselection, it is not prone to reselect the previous cell, that is, possibility of reselecting the previous cell is reduced.

In an embodiment of the present disclosure, a storage medium having computer instructions stored therein is provided, wherein when the computer instructions are executed, any one of the above methods is performed. In some embodiments, the storage medium may be a computer readable storage medium, and may include a non-volatile or a non-transitory memory, or include an optical disk, a magnetic disk or a solid state disk.

In an embodiment of the present disclosure, a UE including a memory and a processor is provided, wherein the memory has computer instructions stored therein, and when the processor executes the computer instructions, any one of the above methods is performed. The UE may include but not limited to terminal devices such as mobile phones, computers or tablets.

It could be understood that the embodiments of the present disclosure are applicable to 5G NR communication systems, 4G and 3G communication systems, and various new communication systems in the future, such as 6G and 7G. The embodiments of the present disclosure are also applicable to different network architectures, including but not limited to relay network architecture, dual link architecture, Vehicle-to-Everything and V2X.

The network side in the embodiments of the present disclosure may include a core network equipment, where the core network may be an Evolved Packet Core (EPC), 5G Core Network or a new core network in future communication systems. The 5G Core Network is composed of a set of devices, implements Access and Mobility Management Function (AMF) providing functions such as mobility management function, User Plane Function (UPF) providing functions such as packet routing and forwarding and Quality of Service (QoS) management, and Session Management Function (SMF) providing functions such as session management and IP address allocation and management. EPC can be composed of MME that provides functions such as mobility management and gateway selection, Serving Gateway (S-GW) that provides functions such as data packet forwarding, and PDN Gateway (P-GW) that provides functions such as terminal address allocation and rate control.

The network side in the embodiments of the present disclosure may be a Base Station (BS) of a radio access network. The base station may also be referred to as a base station equipment, and is a device deployed in a wireless access network to provide wireless communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

The network side in the embodiments of the present disclosure may include a base station controller of a radio access network, which is a device for managing base stations, such as a base station controller (BSC) in a 2G network, a radio network controller (RNC) in a 3G network, or a device that controls and manages base stations in a new communication system in the future.

A terminal in the embodiments of the present disclosure may refer to various forms of User Equipment (UE), access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A cell reselection method, performed by a User Equipment (UE) and comprising:
    based on a number of consecutive Listen-Before-Talk (LBT) failures in a previous cell exceeding a preset threshold, camping on a current serving cell;
    based on cell reselection needing to be performed in the current serving cell, decreasing at least one reselection parameter value of the previous cell, and determining a set of target cells based on reselection parameter values of each cell;
    sorting the target cells in the set; and
    selecting the target cells that are ranked first successively to perform cell reselection,
    wherein the possibility of the target cell being selected becomes lower as the reselection parameter value of the target cell decreases;
    wherein the reselection parameter value comprises a frequency priority, and said determining the set of target cells based on reselection parameter values of each cell comprises:
        determining a frequency priority of each available cell; and determining the set of target cells based on the frequency priorities of the available cells;

wherein said determining the set of target cells based on the frequency priorities of the available cells comprises:

based on the frequency priorities from high to low, determining whether signal quality of the available cell exceeds a preset quality within a preset time period, until it is determined that one or more second available cells whose signal quality exceeds the preset quality within the preset time period are located on one frequency priority; and determining the set of the target cells based on the one or more second available cells, wherein based on the available cells comprising the previous cell, it is determined that the preset time period of the previous cell is longer than the preset time period of other cells in the available cells, and/or it is determined that preset quality of the previous cell is higher than preset quality of other cells in the available cells.

2. The method according to claim 1, wherein the reselection parameter value further comprises an R value, and said sorting the target cells in the set comprises:

determining the R value of each target cell in the set, wherein based on the target cells in the set comprising the previous cell, it is determined that the R value of the previous cell is a value obtained by subtracting a third temporary offset from an initial R value; and sorting the target cells according to the R value, wherein the ranking of the target cell becomes higher as the R value increases.

3. The method according to claim 2, wherein the R value of the previous cell is determined based on following formula, $$R_n = Q_{meas,n} - Q_{offset} - Q_{offsettemp3},$$

where $R_n$ represents the R value of the previous cell, $Q_{meas,n}$ represents a Reference Signal Receiving Power (RSRP) measurement value of the previous cell, $Q_{offset}$ represents an offset value, and $Q_{offsettemp3}$ represents a third temporary offset.

4. The method according to claim 1, wherein prior to said determining the frequency priority of each available cell, the method further comprises:

determining a first available cell based on a frequency where the previous cell is located; and decreasing the frequency priority of the first available cell located on the frequency by a preset level.

5. The method according to claim 1, wherein the reselection parameter value further comprises an R value, and said sorting the target cells in the set comprises:

determining an R value of each target cell in the set; and sorting the target cells according to the R value, wherein the ranking of the target cell becomes higher as the R value increases.

6. The method according to claim 1, wherein based on frequency priority of the second available cell being higher than frequency priority of the current serving cell, the preset quality of the previous cell is determined based on following formula, $$Thresh = Thresh_x + Q_{offsettemp4},$$

or, based on the frequency priority of the second available cell being lower than the frequency priority of the current serving cell, the preset quality of the previous cell is determined based on following formula, $$Thresh = Thresh_x + Q_{offsettemp5},$$

where Thresh represents the preset quality of the previous cell, $Thresh_x$ represents initial preset quality of the previous cell, $Q_{offsettemp4}$ represents a fourth temporary offset, and $Q_{offsettemp5}$ represents a fifth temporary offset.

7. The method according to claim 1, wherein the previous cell is a serving cell that has been camped on within a preset time period.

8. A User Equipment (UE), comprising a memory and a processor, wherein the memory stores one or more programs, the one or more programs comprising computer instructions, which, when executed by the processor, cause the processor to:

based on a number of consecutive Listen-Before-Talk (LBT) failures in a previous cell exceeding a preset threshold, camp on a current serving cell;

based on cell reselection needing to be performed in the current serving cell, decrease at least one reselection parameter value of the previous cell, and determine a set of target cells based on reselection parameter values of each cell;

sort the target cells in the set; and select the target cells that are ranked first successively to perform cell reselection, wherein the possibility of the target cell being selected becomes lower as the reselection parameter value of the target cell decreases;

wherein the reselection parameter value comprises a frequency priority, and said determining the set of target cells based on reselection parameter values of each cell comprises:

determining a frequency priority of each available cell; and determining the set of target cells based on the frequency priorities of the available cells;

wherein said determining the set of target cells based on the frequency priorities of the available cells comprises:

based on the frequency priorities from high to low, determining whether signal quality of the available cell exceeds preset quality within a preset time period, until it is determined that one or more second available cells whose signal quality exceeds the preset quality within the preset time period are located on one frequency priority; and determining the set of the target cells based on the one or more second available cells, wherein based on the available cells comprising the previous cell, it is determined that the preset time period of the previous cell is longer than the preset time period of other cells in the available cells, and/or it is determined that preset quality of the previous cell is higher than preset quality of other cells in the available cells.

9. A non-transitory storage medium storing one or more programs, the one or more programs comprising computer instructions, which, when executed by a processor, cause the processor to:

based on a number of consecutive Listen-Before-Talk (LBT) failures in a previous cell exceeding a preset threshold, camp on a current serving cell;

based on cell reselection needing to be performed in the current serving cell, decrease at least one reselection parameter value of the previous cell, and determine a set of target cells based on reselection parameter values of each cell;

sort the target cells in the set; and select the target cells that are ranked first successively to perform cell reselection, wherein the possibility of the target cell being selected becomes lower as the reselection parameter value of the target cell decreases;

wherein the reselection parameter value comprises a frequency priority, and said determining the set of target cells based on reselection parameter values of each cell comprises:

determining a frequency priority of each available cell; and     determining the set of target cells based on the frequency priorities of the available cells;

wherein said determining the set of target cells based on the frequency priorities of the available cells comprises:

based on the frequency priorities from high to low, determining whether signal quality of the available cell exceeds preset quality within a preset time period, until it is determined that one or more second available cells whose signal quality exceeds the preset quality within the preset time period are located on one frequency priority; and     determining the set of the target cells based on the one or more second available cells, wherein based on the available cells comprising the previous cell, it is determined that the preset time period of the previous cell is longer than the preset time period of other cells in the available cells, and/or it is determined that preset quality of the previous cell is higher than preset quality of other cells in the available cells.

10. The non-transitory storage medium according to claim 9, wherein the reselection parameter value further comprises an R value, and said sorting the target cells in the set comprises:

determining the R value of each target cell in the set, wherein based on the target cells in the set comprising the previous cell, it is determined that the R value of the previous cell is a value obtained by subtracting a third temporary offset from an initial R value; and     sorting the target cells according to the R value, wherein the ranking of the target cell becomes higher as the R value increases.

* * * * *